US006750862B1

(12) United States Patent
Shaw et al.

(10) Patent No.: US 6,750,862 B1
(45) Date of Patent: Jun. 15, 2004

(54) METHOD AND SYSTEM FOR PERFORMING ENHANCED LIGHTING FUNCTIONS FOR TEXTURE MAP DATA

(75) Inventors: Christopher W. Shaw, Pflugerville, TX (US); Goran Devic, Austin, TX (US); Evan Leland, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 1054 days.

(21) Appl. No.: 09/067,321

(22) Filed: Apr. 27, 1998

(51) Int. Cl.$^7$ .............................................. G06T 15/50
(52) U.S. Cl. ...................... 345/426; 345/582
(58) Field of Search ................ 345/426, 429, 345/430, 582

(56) References Cited

PUBLICATIONS

Elliot et al. Inside 3D Studio Max 2. vol. 1. "Chapter 15 Map Channels, Map Types and More Material Types". New Riders Publishing. Indianapolis, IN. pp. 647–648. Mar., 1998.*

* cited by examiner

*Primary Examiner*—Mark Zimmerman
(74) *Attorney, Agent, or Firm*—Silicon Valley IP Group PC; Kevin J. Zilka

(57) ABSTRACT

A method and system for performing enhanced lighting functions with respect to texture map data is operable within a computer controlled graphics display system and allows defined portions of a texture map to bypass prescribed lighting processes. Within a texture map, each texel data (u,v) is defined to contain color information and a control code (e.g., "texel light bit"). The texel light bit indicates to the lighting process whether or not texel color modulation is to occur to this texel data. In one embodiment, if the texel light bit is set, then no lighting modifications (e.g., color modulations) are performed with respect to the texel data. Also, if the texel light bit is not set, then normal lighting modifications are performed with respect to the texel data. In this way, the present invention allows texture map data to be lit in a non-uniform manner across a same graphics primitive. The present invention is particularly useful with respect to graphics objects (e.g., lights, indicator bulbs, glowing regions of the texture map) which should remain unaffected by external light sources (e.g., the sun, the moon, darkness of the night) within a three-dimensional graphic scene. By defining certain texel regions as having "texel lights", the present invention then bypasses the external lighting conditions applied to the display scene for these regions.

26 Claims, 8 Drawing Sheets

METHOD AND SYSTEM FOR PERFORMING ENHANCED LIGHTING FUNCTIONS FOR TEXTURE MAP DATA

FIELD OF THE INVENTION

The present invention relates to the field of computer controlled graphics display systems. More specifically, the present invention relates to computer controlled graphics display systems utilizing texture mapping and lighting graphics techniques.

BACKGROUND OF THE INVENTION

Computer controlled graphics systems are used for displaying graphics objects on a display. These graphics objects may comprise graphics primitive elements ("graphics primitives") which include points, lines, polygons, etc. The graphics primitives may be used to render a two-dimensional (2D) image of a three-dimensional (3D) object on a display screen. Although the displayed image is 2D, it depicts a 3D scene. In the process of rendering 3D graphics, many techniques are used to create realistic 3D effects. Some of these techniques involve Gouruad shading, texture mapping, bilinear filtering, specular lighting, and fogging effects. Texture mapping refers to techniques for adding surface detail to areas or surfaces of these 3D graphics objects displayed on a 2D display. Often texture map information is added to polygon primitives.

Generally, texture mapping occurs by accessing encoded surface detail points or "texels" from a texel map memory space ("texel map") which stores the surface detail, and transferring the surface detail texels to predetermined points of the graphics primitive (e.g., polygon primitive) to be texture mapped. The process of determining the proper texels which correspond to pixels is called sampling the texture map. The texture image within a texture map may be represented in computer memory as a bitmap or other raster-based encoded format. In memory, texels reside and are thereby accessed in a (u, v) texture coordinate space. However, the display screen includes point elements (pixels) which reside in an (x, y) display coordinate space. Therefore, texture mapping applies color or visual attributes of texels of the (u, v) texture map to corresponding pixels of the graphics object (primitive) on the display screen. Color values for pixels in (x, y) display coordinate space are determined based on sampled texture map values.

After texture mapping, the picture stored in the texture map is applied (or wapped) onto the graphics primitive. Because the original graphics object is 3D, texture mapping often involves maintaining certain perspective attributes with respect to the surface detail added to the object. Therefore, the rate in which a texture map is sampled, e.g., by du and dv values, is different depending on the perspective and size of the polygon. Perspective on the object can therefore distort the texture image.

Another process used to create realistic three dimensional objects in a computer display system, in addition to texture mapping, is lighting. In many graphics systems, light modifies the shading of the color associated with texture map data used during texture mapping and varies depending on the relative screen position of the texture map data with respect to any relevant light sources. Currently, texture map data displayed within a single primitive is lit uniformly using prior art display processes. Currently, there exists no known mechanism for lighting up regions of a texture map within a single graphics primitive and also simulating lights, indicator bulbs or glowing regions on the texture map which remain unaffected by external light sources (e.g., the sun, moon or darkness of night) within a three dimensional scene. This is the case because lighting processes are applied uniformly over all texels of a graphics primitive.

For example, FIG. 1 illustrates an exemplary three-dimensional graphic image 10 displayed on a two-dimensional display screen in a computer controlled graphics display system. Within the image 10 is shown a building 12, having multiple back-lighted windows 16a–16e and a light source 14. The effect of light from an external light source (e.g., the moon, the sun, etc.), not shown in FIG. 1, can also be included in image 10. Any of the objects of image 10 can include texture maps displayed therein. In this depiction, it is assumed that the building 10 contains lit windows 16a–16e that should be visualized in the darkness of night. Assume the image 10 is also to be displayed with the afternoon sun overhead.

One prior art method of simulating the above scenes is to use a single graphic object to represent the building 12 and to use a single texture map within the black building 12; the single texture map would include regions defined therein for the yellow windows 16a–16e. Lighting conditions are then applied to the texture data. In accordance with this prior art graphics display technique, when the building is viewed in darkness, since little external light is applied, the windows 16a–16e will not appear to be back-lit very strongly and the result is not a very realistic evening scene because the windows 16a–16e should be brighter. Moreover, when this building 12 is exposed to an external light source (e.g., the sun), the widows 16a–16e and the lamp 14 become lit even brighter and the building 12 still appears dark in the daylight. However, the desired or "realistic" image should show the windows 16a–16e remaining constant in brightness and the building becoming lighter. The reason these resulting images do not appear "realistic" using this prior art mechanism is largely an outcome of the lighting process acting uniformly over all texel data of the texture map for a given graphics primitive (e.g., the building).

Another prior art method of simulating the above effect is to use separate geometric primitives for the windows 16a–16e which are different from the graphic primitive used for the building 12. Because separate geometric primitives are used for these display regions, the rendering processes can non-uniformly apply lighting to these display regions. Although this prior art mechanism can yield the desired "realistic" image, it consumes more processing time because more geometric primitives are required to render the image 10. More geometric primitives also translate into more computer processing time thereby making this technique slower. Also, the description of the image 10 (e.g., the display list) becomes more complex due to the addition of the extra geometric primitives, thereby requiring more memory to store and implement image 10.

Accordingly, what is desired is to have a constant color on some objects of a three dimensional scene (e.g., constant with respect to the external light conditions) while allowing variable color shading on the other objects (e.g., variable with respect to the external light conditions) of the three-dimensional scene without requiring an undue amount of processing time or consuming an undue amount of memory resources.

SUMMARY OF THE INVENTION

Accordingly, the present invention provides a graphics system and method for providing a constant color on some objects of a three-dimensional scene (e.g., constant with respect to the external light conditions) while allowing variable color shading on the other objects (e.g., variable with respect to the external light conditions) of the three-dimensional scene without requiring an undue amount of processing time or memory resource consumption. More specifically, the present invention provides the above advantageous functionality within a system that utilizes texture map data displayed in a graphics primitive that can be non-uniformly lit from an external light source. These and other advantages of the present invention not described above will become clear in view of the following detailed description of the present invention.

A method and system are described herein for performing enhanced lighting functions with respect to texture map data. The present invention is operable within a computer controlled graphics display system and allows defined portions of a texture map to bypass prescribed lighting processes thereby avoiding the application of lighting conditions to these portions of the texture map data. The present invention therefore adds increased lighting options and capability to the texture map data. Within a texture map, each texel (u, v) is defined to contain color information and a control bit ("texel light bit"). The texel light bit indicates to the lighting processes of the present invention whether or not texel color modulation is to occur to this texel. In one embodiment, if the texel light bit is set, then no lighting modifications (e.g., color modulations) are performed with respect to the texel data. Also, if the texel light bit is not set, then normal lighting modifications are performed with respect to the texel data. In this way, the present invention allows texture map data to be lit in a non-uniform manner across the texture image for a given graphics primitive. This is particularly useful with respect to graphic objects (e.g., lights, indicator bulbs, glowing regions of the texture map) that should remain unaffected by external light sources (e.g., the sun, the moon, darkness of the night) within a three-dimensional graphic scene while adjacent texture map images should respond to lighting conditions. By defining certain texture map regions as having "texel lights," the present invention then bypasses the external lighting conditions applied to the display scene for these regions.

Specifically, in a computer controlled graphics display system, an embodiment of the present invention includes a method of displaying a graphics image comprising the steps of: a) accessing a memory unit to obtain a graphics primitive; b) translating the graphics primitive into a plurality of pixels each having a two-dimensional display coordinate; and c) displaying the graphics primitive on a display screen, the step c) comprising the steps of: c1) for a respective pixel, obtaining from a texture map a corresponding texel, the corresponding texel comprising a control bit and a color value and having a two dimensional texel coordinate; c2) responsive to the control bit, selectively performing a lighting operation to modify the color value of the corresponding texel based on a lighting condition, the step c2) bypassing the lighting operation for the corresponding texel provided the control bit is of a first value; c3) displaying the respective pixel on the display screen with the color value of the corresponding texel; and c4) repeating the steps c1)–c3) for each of the plurality of pixels of the graphics primitive.

Embodiments include the above and wherein the lighting condition is a value dependent on an amount of light within a three dimensional graphic scene to be displayed on the display screen, the graphics primitive being part of the three dimensional graphic scene, and wherein the lighting operation of the step c2) comprises the step of multiplying the lighting condition with the color value of the corresponding texel. Embodiments also include a system implemented in accordance with the above.

DESCRIPTION OF THE PREFERRED EMBODIMENTS

In the following detailed description of the present invention, a method and system for performing enhanced lighting functions with respect to texture map data to provide for non-uniform texture map lighting for a graphics primitive, numerous specific details are set forth in order to provide a thorough understanding of the present invention. However, it will be obvious to one skilled in the art that the present invention may be practiced without these specific details or by using alternate elements or methods. In other instances well known methods, procedures, components, and circuits have not been described in detail as not to unnecessarily obscure aspects of the present invention.

NOTATION AND NOMENCLATURE

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block, process, and the like, is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. For reasons of convenience, and with reference to common usage, these signals are referred to as bits, values, elements, symbols, characters, terms, numbers, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that throughout discussions of the present invention, discussions utilizing terms such as "processing" or "computing" or "calculating" or "determining" or "displaying" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

COMPUTER SYSTEM PLATFORM

Figure 1:
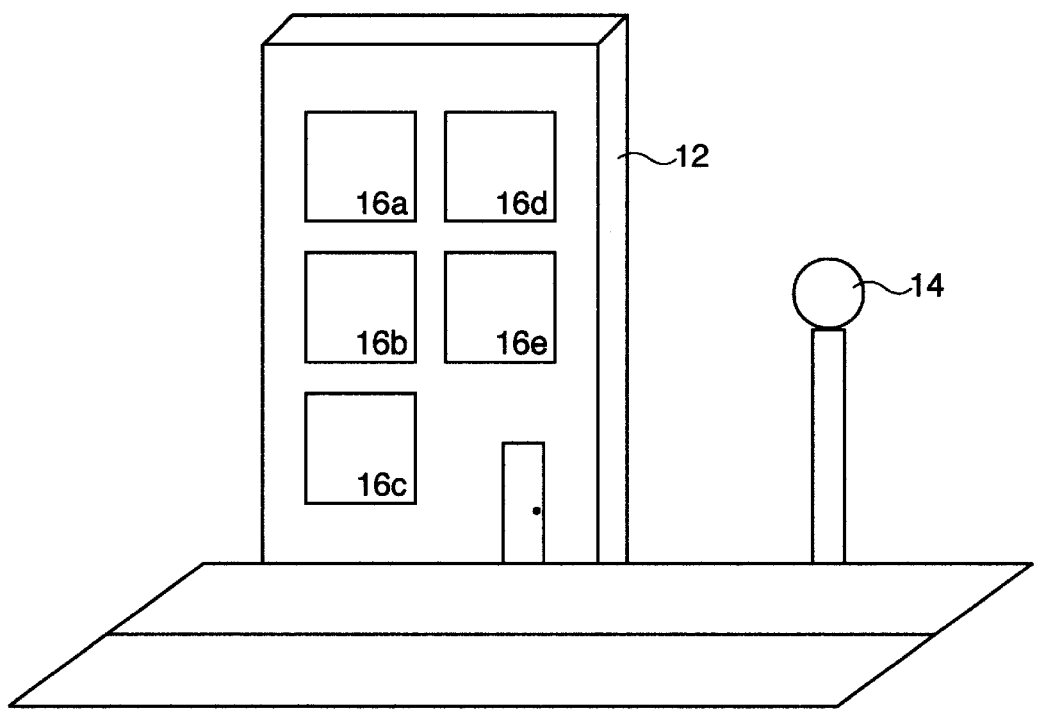
FIG. 1 is a diagram illustrating a three dimensional graphic scene for display on a display screen of a computer controlled graphics display system.
Figure 2:
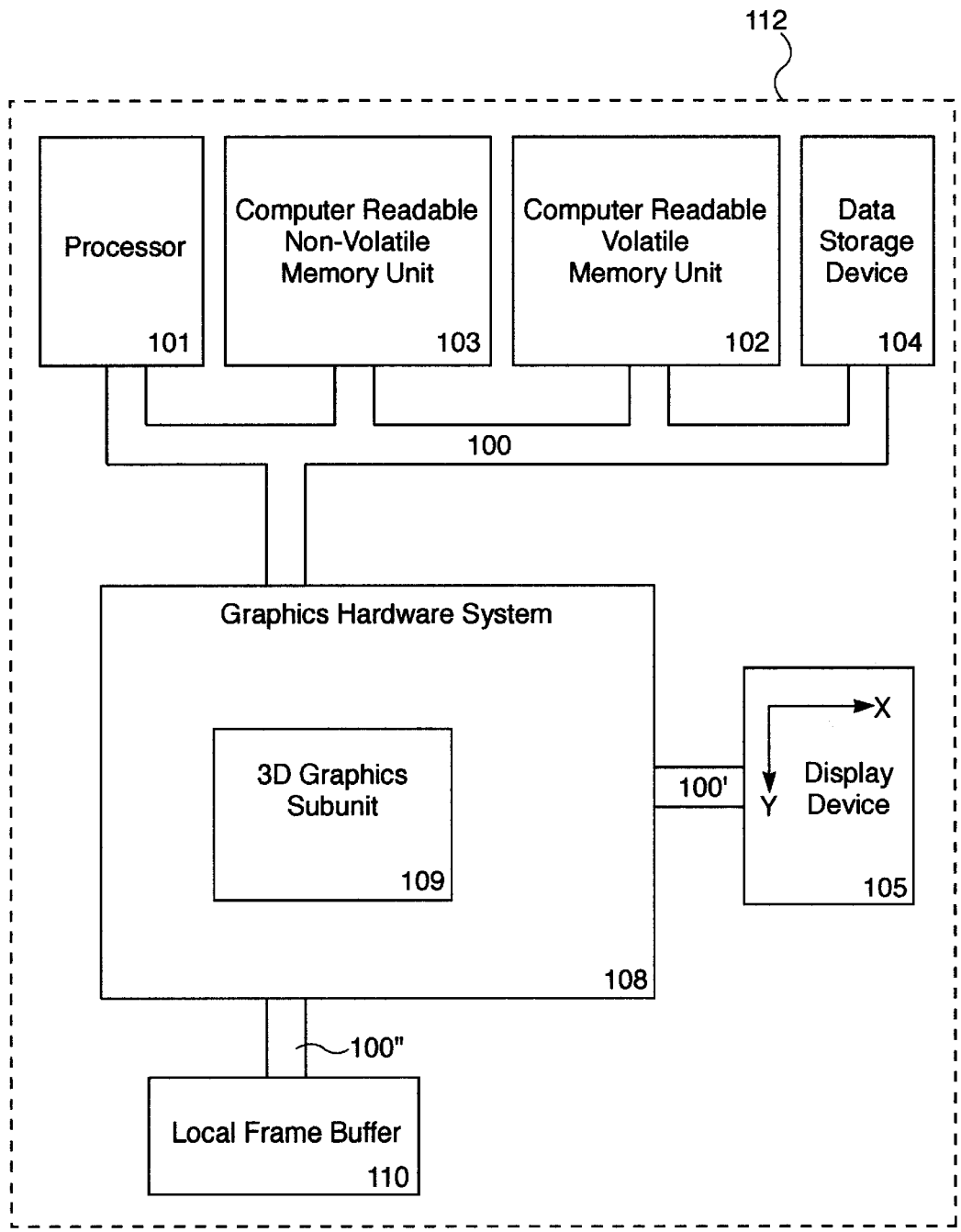
FIG. 2 is a block diagram of an exemplary computer controlled graphics display system used in accordance with the texture lighting embodiments of the present invention.

FIG. 2 illustrates a computer controlled graphics display system 112. Within the following discussions, certain processes (e.g., processes 300 and 610) and steps are discussed which maybe implemented on system 112 in certain embodiments of the present invention. Certain steps may be implemented on specialized circuitry and/or by instructions which reside within computer readable memory units of system 112 and executed by processors of system 112. When executed, the instructions cause the computer system 112 to perform specific actions and exhibit specific behavior which is described in detail to follow.

In general, computer controlled graphics display system 112 used by the present invention includes an address/data bus 100 for communicating information, one or more central processors 101 coupled with address/data bus 100 for processing information and instructions and a computer readable volatile memory unit 102 (e.g., random access memory, static RAM, dynamic, RAM, or the like) coupled with address/data bus 100 for storing information and instructions for central processor(s) 101. Computer controlled graphics system 112 also includes a computer readable non-volatile memory unit (e.g., read only memory, programmable ROM, flash memory, EPROM, EEPROM, or the like) 103 coupled with address/data bus 100 for storing static information and instructions for central processor(s) 101.

Computer controlled graphics display system 112 of FIG. 2 also includes a mass storage computer readable data storage device 104 (hard drive or floppy) such as a magnetic or optical disk and disk drive coupled with address/data bus 100 for storing information and instructions. System 112 also includes a display device 105 for displaying information to the computer user, an optional alphanumeric input device 106 including alphanumeric and function keys coupled to address/data bus 100 for communicating information and command selections to central processor(s) 101, an optional cursor control device 107 coupled to the bus for communicating user input information and command selections to central processor(s) 101, and an optional signal generating device 108 coupled to address/data bus 100 for communicating command selections to central processor(s) 101. Display device 105 is mapped by (x,y) coordinates and can be of a number of well known designs including a cathode ray tube (CRT) device, a liquid crystal (LCD) device, a field emission device (FED) flat panel CRT, or the like. In one exemplary implementation, computer controlled graphics system 112 is an x86 microprocessor architecture based computer system, but could equally be of a number of other various well known and commercially available platforms.

Computer controlled graphics display system 112 provides data and a control signals via address/data bus 100 to a graphics hardware unit ("graphics card") 109. Graphics card 109 typically contains one or more display processor engines which execute a series of display instructions found within a display list. Graphics card 109 supplies data and control, signals to a frame buffer memory 110 which refreshes display device 105 for rendering images (including graphics images). Graphics card 109 contains one or more specialized circuits for performing graphics rendering processes at high speed for producing real-time realistic 3D images on display 105. As described further below, graphics card 109 is implemented (in either software or hardware) to provide for non-uniform lighting of texture data of a texture map for a graphics primitive in accordance with the present invention.

Figure 3:
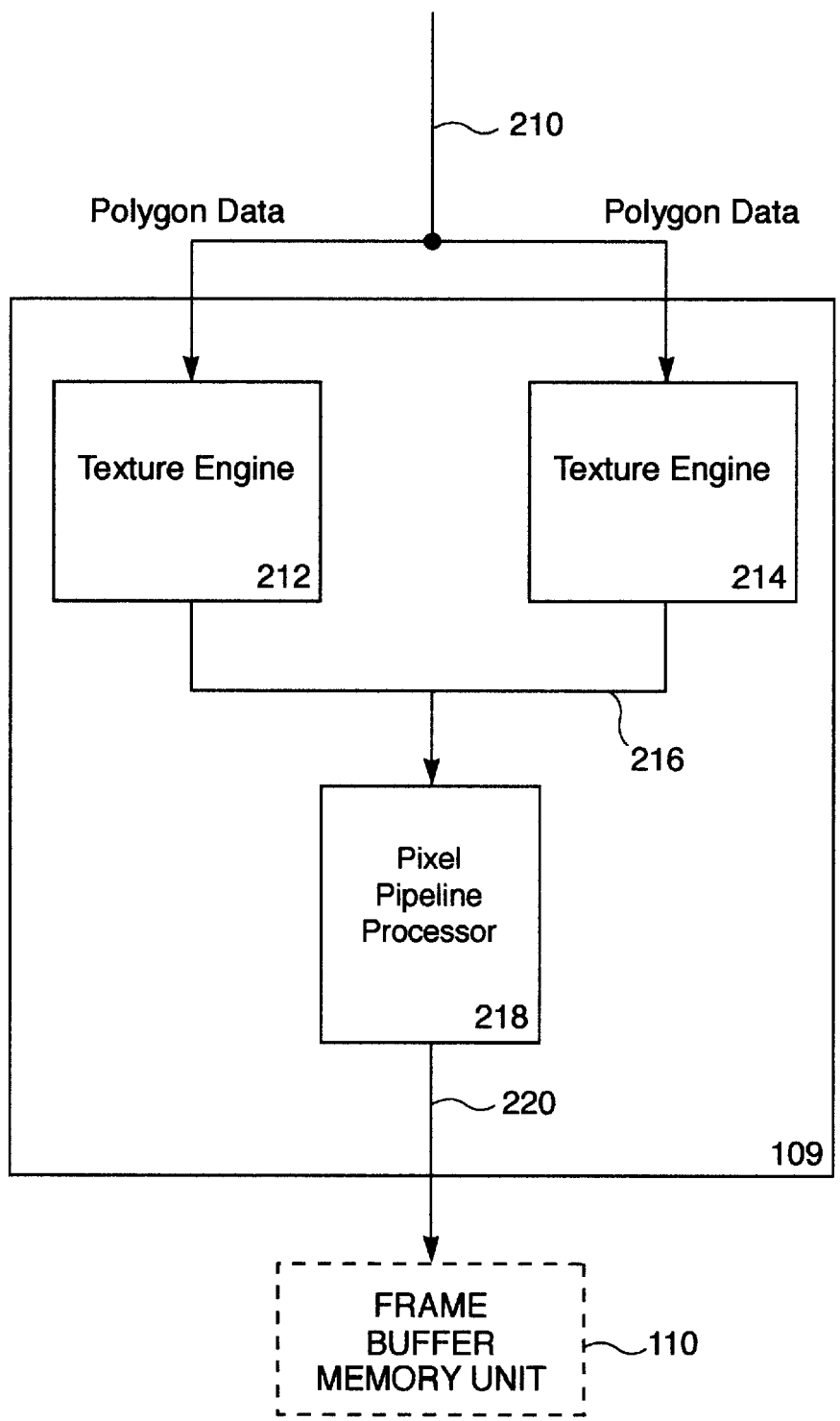
FIG. 3 is an exemplary logical block diagram of the graphics controller circuit as illustrates in FIG. 2.

FIG. 3 illustrates a high level block diagram of a portion of graphics card 109. A bus 210 provides graphics primitive data (e.g., polygon data) representing individual primitives. Polygon primitives contain three or more vertices each and associated with each vertex are certain parameters (e.g., color data, spatial coordinates, alpha values, perspective values, or the like) which are used to define the graphic primitive. Polygon data is fed to a texture engine 212 and to a polygon engine 214. The texture engine 212 is used to obtain texture data (e.g., "texels") from texture maps stored in computer memory. The texture data is mapped into the polygon in a processed called "texture mapping." Texture data is stored in the texture map and accessed therefrom according to (u, v) coordinates. Each (x, y) pixel of a polygon primitive has a corresponding (u, v) "texel" associated therewith during display processing. Translation between (x,y) and (u,v) occurs during texture mapping and can be done by engine 214 and engine 212. Texture engine 212 is used to access this (u, v) texel for a given (x, y) pixel of a polygon primitive.

Polygon engine 214 of FIG. 3 is used to transform a graphics primitive from a three dimensional data structure to a two-dimensional data structure for display on the two-dimensional screen 105. The polygon engine 214 also "rasterizes" the two-dimensional polygon by determining the two-dimensional pixels, in (x, y) space, that make up the polygon. The output of polygon engine 214 and texture engine 212 are combined at pixel pipeline processor 218 which performs a number of tasks including the texel lighting processes of the present invention. The output 220 of pixel pipeline processor 218 is typically raster format data and is stored into frame buffer memory 110 for periodic refresh on display screen 105.

NON-UNIFORM TEXTURE LIGHTING OF THE PRESENT INVENTION

Figure 4:
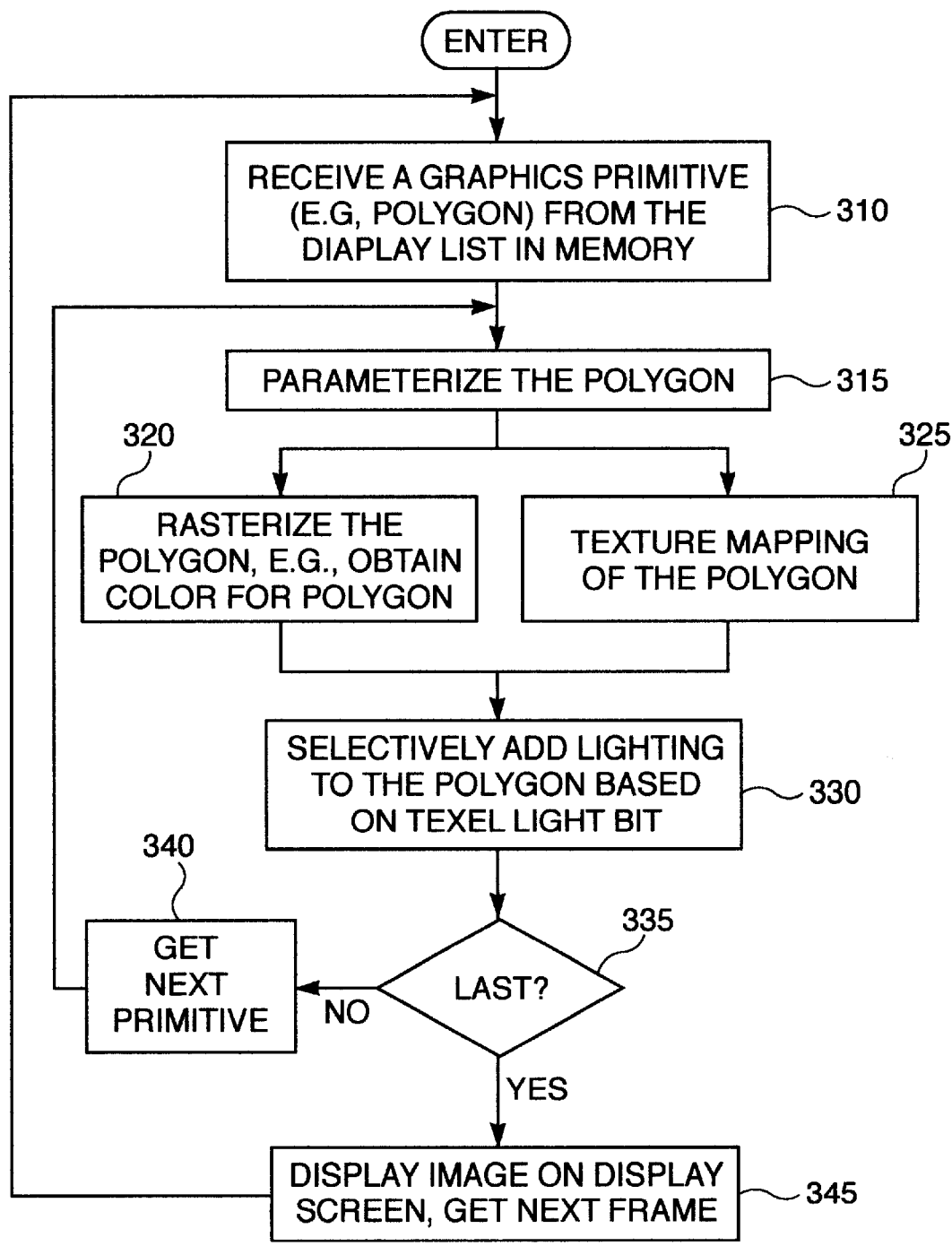
FIG. 4 is a flow diagram illustrating of a polygon rendering process in accordance with the present invention.

FIG. 4 is a flow diagram 300 illustrating of a method of displaying graphics images on display screen 105 in accordance with the present invention. One embodiment of the present invention includes a specialized "texel light" code or "bit" mapped into the texel data which is used by the lighting processes of the present invention. The "texel light" codes allow the present invention to apply a given lighting condition to regions of texture data in a non-uniform manner within a graphics primitive.

Process 300 commences at step 310 where a current graphics primitive is accessed from the display list of the computer memory. The display list used by the present invention contains a structured listing of graphics primitives and can be implemented using any of a number of well known display list structures and techniques. At step 315, the current graphics primitive is parameterized in preparation of being rasterized. Although a number of different parameterization processes and/or parameterization circuitry may be used at step 315 in accordance with the present invention, particular parameterization processes that can be used are described in the following patent applications: co-pending U.S. patent application Ser. No. 08/777,558 filed Dec. 30, 1996 and entitled "Method for Computing Parameters Used in a Non-Homogeneous Second Order Perspective Texture Mapping Process Using Interpolation," by Einkauf et al.; co-pending U.S. patent application Ser. No. 08/774,787 filed Dec. 30, 1996 and entitled "Non-Homogeneous Second Order Perspective Texture Mapping Using Linear Interpolation Parameters," by Vaswani, et. Al; and co-pending U.S. patent application Ser. No. 08/777,556 filed Dec. 30, 1996, entitled "Circuit for Determining Non-Homogeneous Second Order Perspective Texture Mapping Coordinates Using Linear Interpolation," by Vaswani et al., all incorporated herein by reference.

At step 320, of FIG. 4, the current graphics primitive (e.g., current polygon) is rasterized into a plurality of pixels, each pixel having a respective (x, y) display coordinate. At step 325, the current polygon is texture mapped. At step 325, the texture data (e.g., texels) corresponding to the pixels of the polygon are obtained. At step 325, the (x, y) display coordinates of the pixels of step 320 are translated into corresponding (u, v) coordinates using well known texture mapping process. The reference, T(u, v), corresponds to a texel at the (u, v) coordinate of the texture map which corresponds to the particular pixel (x, y). Perspective texture mapping is implemented at step 325. As described above, "texel light" codes are placed within the texels of the texture map data accessed by step 325. The "texel light" codes control the way in which lighting is performed on a texel by texel basis in accordance with the present invention.

At step 330, lighting is added to the pixels of the current polygon. The lighting conditions vary depending on the current three dimensional scene processed by the graphics card 109. As is well known, lighting conditions of a given scene vary depending on the external light sources (e.g., sun, moon, etc.) and internal light sources (e.g., lights, lamps, bulbs, etc.) that influence the objects of the scene. At step 330, using well known methods, the present invention is able to determine a lighting value for each (x, y) coordinate of the displayed scene. This lighting value is referred to herein as, L(x, y), and indicates the amount of "lumens" that are associated with a particular pixel of the current polygon. The lumen value for a particular pixel is 1.0 for maximum lighting conditions (e.g., the sun) and is 0.0 for full darkness with other values in between, e.g., 0.5, representing medium lighting conditions. It is appreciated that other lumen ranges in addition to (0 to 1) can also be used by the present invention.

It is appreciated that within the present invention, lighting can also be interpolated along a single polygon to simulate a polygon that is bright at one corner (e.g., with lumen=1) and dark at another corner (e.g., with lumen <0.5). In this way, lighting varies along the polygon on a per pixel basis.

In one embodiment, lighting is implemented at step 330 for each pixel by multiplying the corresponding texel color value for the pixel by the lumen value for that pixel. The following lighting operation is selectively applied (depending on the texel lighting bit of the texel) to implement lighting for each pixel (x,y):

$$\text{pixel\_color}(x, y) = T(u, v) * L(x, y)$$

where pixel_color(x, y) is the resulting pixel color stored in the frame buffer for the (x, y) coordinate display position, T(u, v) is the corresponding texel for the pixel obtained during texture mapping, and L(x, y) is the lumen value for the given pixel.

At step 335 of FIG. 4, the present invention checks if the last polygon has been processed. If so, then at step 345 the frame buffer 110 is displayed onto display 105 and the scene is visualized. Step 310 is then entered to commence constructing the next display frame. At step 335, if another polygon is available, step 340 is entered where the next polygon is fetched from the display buffer in computer memory and step 315 is entered to parameterize this next polygon.

Figure 5:
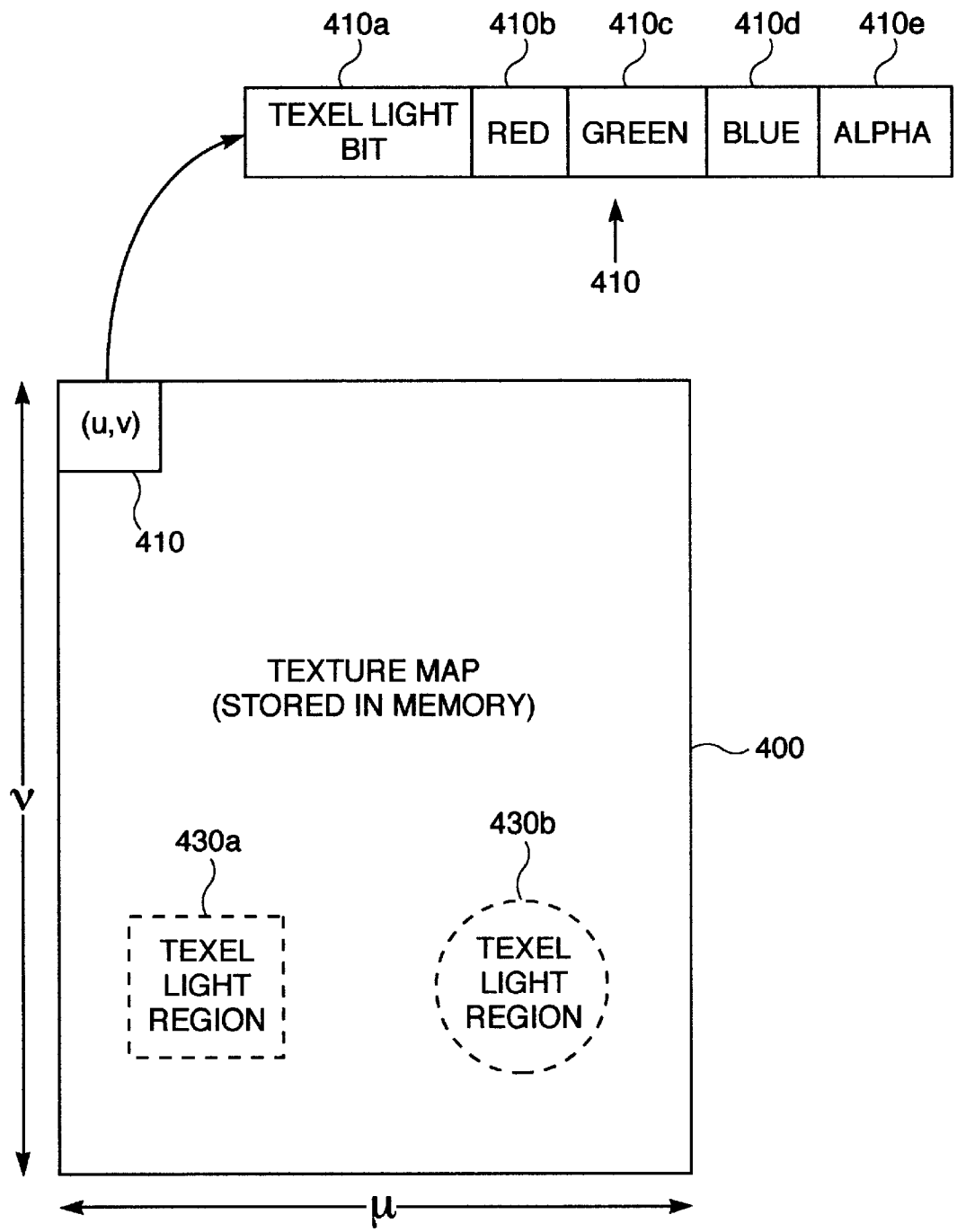
FIG. 5 is a diagram illustrating of a texture map in accordance with the present invention and illustrating a texel (u,v) having color and texel light information.

FIG. 5 illustrates the components of a texel 410 in accordance with the present invention. Each texel 410 is located at a coordinate (u, v) indicating the texel's position within the texture map 400 stored in memory. Each texel 410 contains a red color component 410b, a green color component 410c and a blue color component 410d. These color components can be of any bit size but in one embodiment they are each 5 bits wide and in another embodiment they are each 8 bits wide. The texel 410 also contains an alpha value 410e that represents the degree to which the corresponding color components 410b–410d are transparent. Alpha component 410e can be any bit size but in one embodiment it is 1 bit wide and in another embodiment it is eight bits wide.

In accordance with the present invention, the texel 410 also contains a texel light bit 410a. Texel light bit 410a indicates, for texel 410, whether or not texel 410 participates in the lighting operation of step 330 of FIG. 4. On a texel-by-texel basis, portions of texture map 400 can be excluded from the lighting operations of step 330. In this way, certain regions of the texture map, e.g., regions 430a and 430b, may be excluded from lighting operations. By excluding certain regions 430a, 430b of the texture map 400 from lighting operations, the present invention allows non-uniform application of lighting across a texture image for a graphics primitive without requiring separate graphic objects. Since the texels each have their own texel light bit, regions 430a and 430b can take on any shape and the square and circle shapes are exemplary only.

Figure 6:
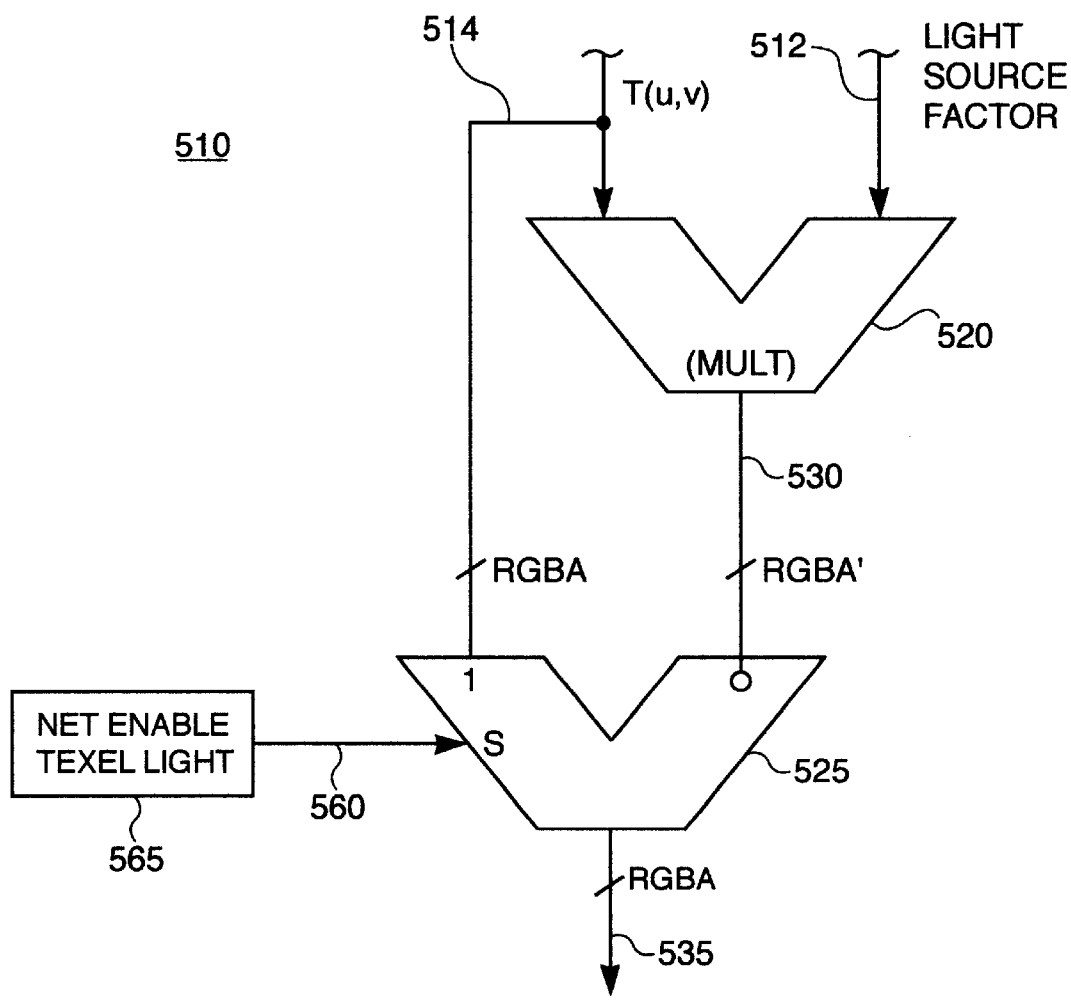
FIG. 6 is a block diagram illustrating for performing texel lighting in accordance with an embodiment of the present invention.

FIG. 6 is a block diagram of an apparatus 510 of the pixel pipeline processor 218 that may be used during step 330 to perform the selective application of the lighting operation to each texel in accordance with the present invention. Texels are processed through circuit 510 individually. The RGB and alpha (RGBA) data for a texel, T(u, v), is presented over bus 514 and the light source factor, L(x, y), for this texel data 410 is presented over bus 512. Bus 514 and bus 512 are input as two operands to a multiplication circuit 520 which generates an RGBA result over bus 530. Bus 530 is supplied as a first input to a multiplexer circuit 525. The other input to multiplexer circuit 525 is bus 514. The select line 560 of multiplexer circuit 525 is control by a net enable texel light signal 565 presented over line 560. In one embodiment of the present invention, net enable texel light signal 565 is merely texel light bit 410a for given texel 410. In another embodiment of present invention, net enable texel light signal 565 is obtained according to circuit of FIG. 8. The output of multiplexer 525 is supplied over line 535 to the remainder of pixel pipeline 218.

In this configuration 510, when the net enable texel light signal 565 is asserted, then texel T(u, v) bypasses the lighting operation and is not modified. However, when net enable texel light signal 565 is not asserted, then the texel T(u, v) is processed by lighting operation 520 and is color modulated depending on the light source factor, L(x, y).

Figure 8:
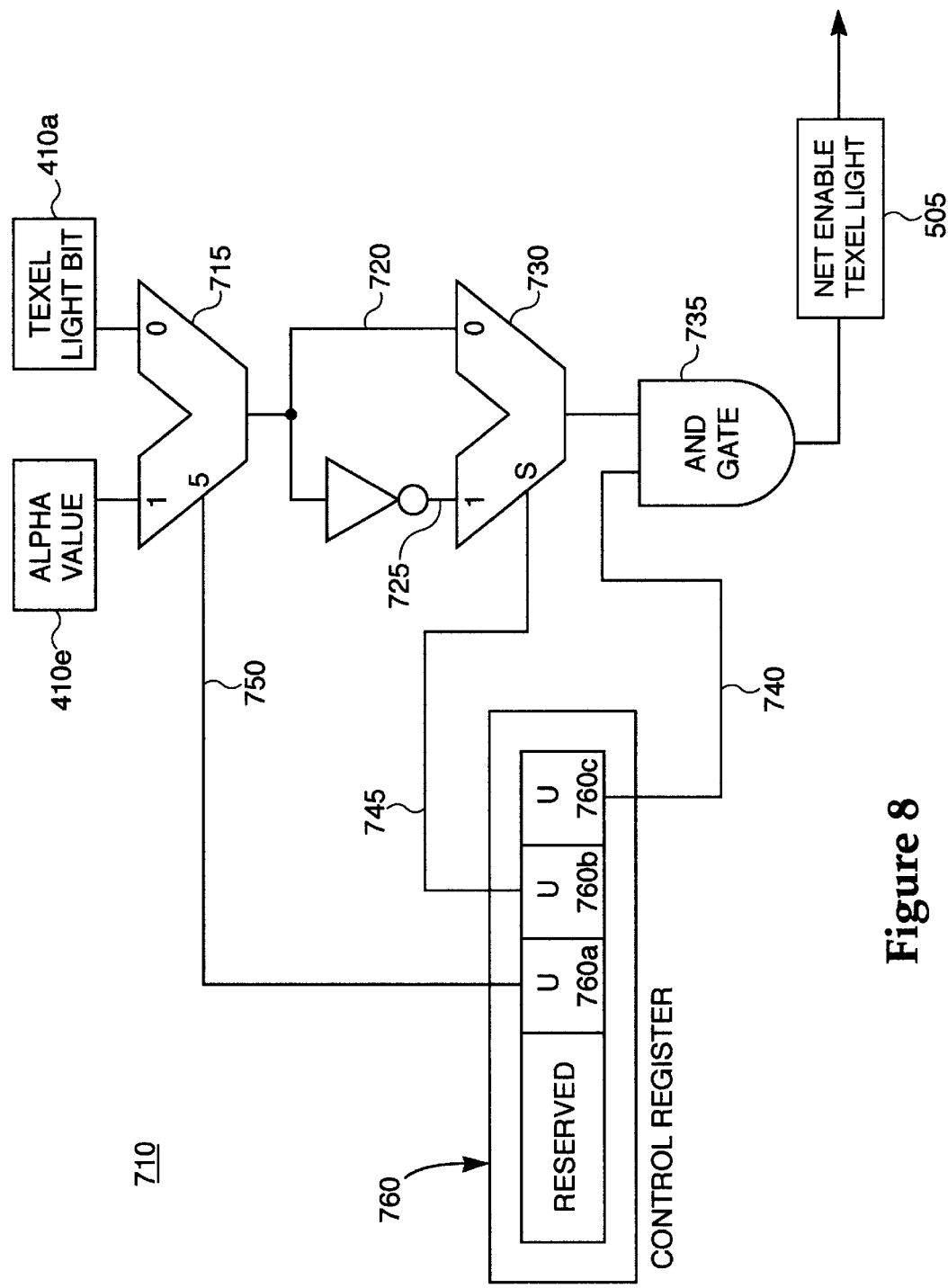
FIG. 8 is a block diagram of an apparatus for generating a net texel lighting enable signal in accordance with one embodiment of the present invention.

FIG. 8 is a block diagram of a apparatus 710 used in one embodiment of the present invention for generating the net enable texel light signal 565. A control register 760 is provided within graphics card 109. Control register 760 contains a use bit (U) 760a, a polarity bit (P) 760b and an enable bit (E) 760c. For a particular texel 410, alpha value 410e is supplied to one input of multiplexer 715 and texel light bit 410a is supplied to the other input of multiplexer 715. The select line of multiplexer 715 is controlled by the use bit 760a over line 750. The output 720 of the multiplexer 715 is supplied to one input of multiplexer 730 and the other input of multiplexer 730 receives line 725 which is the inversion of line 720. The select line of multiplexer 730 is controlled by polarity bit 760b over line 745. The output of multiplexer 730 is fed into one input of AND gate 735 and the other input of AND gate 735 is obtained from enable bit 760c of the control register 760. The AND gate 735 generates net enable texel light signal 565. A new net enable texel light signal 565 is generated for each new texel.

In this circuit 710, enable bit 760c indicates whether the texel lighting functions of present invention are active or not active. If the enable bit 760c is not set, then the lighting operation is applied to all texels regardless of the value of texel lights 410a. Use bit 760a indicates whether texel light bit 410a is used to control texel lighting or if alpha value 410e is used to control texel lighting. The value of use bit 760a is only relevant provided the enable bit 760c is set. Lastly, polarity bit 760b indicates the value of the texel light bit (or alpha value bit) that invokes the light bypassing operation of texel lighting. The value of the polarity bit 760b is only relevant provided enable bit 760c is set. When polarity bit 760b is "0" then a value of "1" within texel light bit 410a or alpha value 410e causes the corresponding texel 410 to bypass texel lighting operations. When the polarity bit 760b is "1" then a value of "0" within the texel light bit 410a or alpha value 410e causes corresponding texel 410 to bypass texel lighting operations. In the circuit 710, the texel light bit 410a is only one component in the generation of net enable texel light signal 565.

Figure 7:
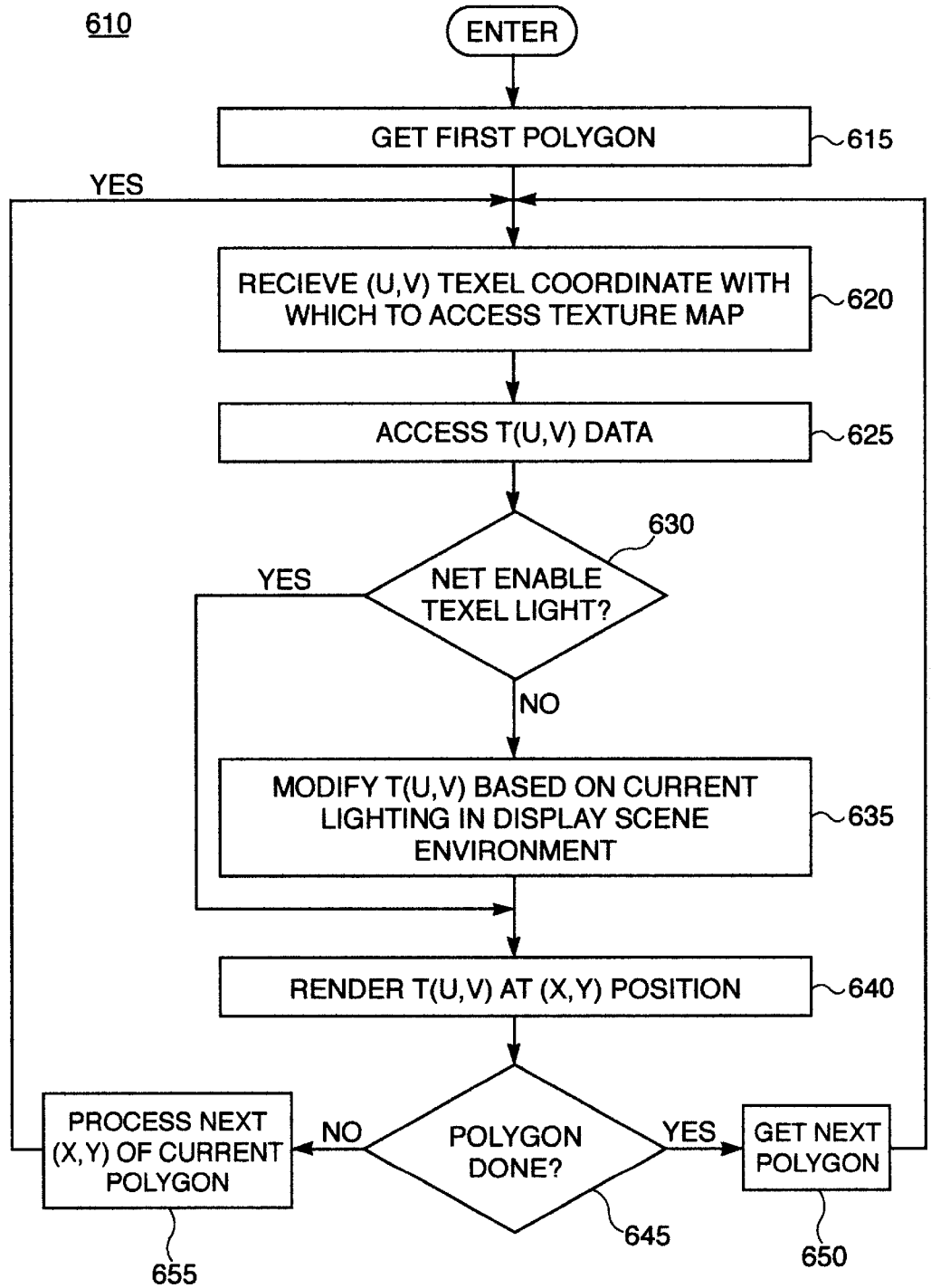
FIG. 7 is a blow chart of a method of performing texel lighting in accordance with another embodiment of the present invention.

FIG. 7 is a flow chart illustrating a software embodiment 610 of the circuit 510 of FIG. 6. At step 615 of FIG. 7, the present invention obtains a first polygon and rasterizes the polygon to obtain a set of pixels for the polygon, each pixel having an (x, y) screen coordinate. At step 620, the present invention obtains a corresponding texel coordinate (u, v) for a respective pixel at the (x, y) screen coordinate. At step 625, texture map 400 is accessed using the (u, v) coordinate to obtain a corresponding texel 410. At step 630, the value of the net enable texel light signal for texel 410 is examined. In one embodiment, the net enable texel light signal for texel 410 is merely texel light bit 410e for texel 410. In another embodiment the net texel light signal is derived according to FIG. 8. If the net enable texel light signal is asserted, then step 640 is entered and lighting operation of step 635 is bypassed. At step 630, if the net enable texel light signal is not asserted then step 635 is entered. At step 635, the present invention applies a lighting operation to the color data of the texel, T(u, v) as described to FIG. 4. At step 640, texel T(u, v) is displayed at the (x, y) position of the corresponding pixel.

At step 645 of FIG. 7, a check is made if all the pixels of the current polygon have been fully processed. If not, then at step 655, the present invention obtains a new pixel and step 620 is entered again. At step 645, if the current polygon has been fully processed, then at step 650 a new polygon is obtain and step 620 is entered again.

By controlling the value of texel light bit 410a for each texel, a graphic designer can create custom regions within the texture map that are unaffected by lighting operations. In this way, the present invention provides an effective mechanism for allowing texture map data of a given graphics primitive to be lit non-uniformly within a computer controlled graphics display system. This feature allows designers added flexibility to create more realistic three dimensional graphic scenes using the computer controlled display system, without unnecessarily consuming processor or memory resources.

The preferred embodiment of the present invention, a method and system for performing enhanced lighting functions with respect to texture map data to provide for non-uniform texture map lighting for a graphics primitive, is thus described. While the present invention has been described in particular embodiments, it should be appreciated that the present invention should not be construed as limited by such embodiments, but rather construed according to the below claims.

What is claimed is:

1. In a computer controlled graphics display system, a method of displaying a graphics image, said method comprising the steps of:
   accessing a memory to obtain a graphics primitive,
   translating the graphics primitive into a plurality of pixels, each of the plurality of pixels having a two-dimensional display coordinate, and
   displaying the graphics primitive on a display screen, said step of displaying comprising the steps of:
      for each respective pixel, obtaining from a texture map a corresponding texel, the corresponding texel comprising a control code and a color value and having a two-dimensional texel coordinate,
      for each corresponding texel, when the control code is of a first value, selectively performing a lighting operation to modify the color value of the corresponding texel based on a lighting condition, and bypassing said lighting operation for the corresponding texel when the control code is of a second value, and
      displaying each of the respective pixels on the display screen with the color value of the corresponding texel.

2. The method of claim 1,
   wherein the lighting condition is a value dependent on an amount of light within a three-dimensional graphic scene to be displayed on the display screen,
   wherein the graphics primitive is part of the three-dimensional graphic scene, and
   wherein said step of selectively performing a lighting operation comprises the step of multiplying the lighting condition with the color value of the corresponding texel.

3. The method of claim 1,
   wherein the color value of the corresponding texel comprises:
      a red color component;
      a green color component; and
      a blue color component.

4. The method of claim 1,
   wherein the control code of the corresponding texel is contained within an alpha component of the corresponding texel.

5. The method of claim 1,
   wherein the control code of the corresponding texel is programmable between the first value and the second value where the first value is a logical "1".

6. The method of claim 1,
wherein the control code of the corresponding texel is programmable between the first value and a second value wherein the second value is a logical "0".

7. In a computer controlled graphics display system, a method of displaying a graphics image, said method comprising the steps of:
- accessing a memory to obtain a graphics primitive,
- translating the graphics primitive into a plurality of pixels, each of the plurality of pixels having a two-dimensional display coordinate, and
- displaying the graphics primitive on a display screen, said step of displaying comprising the steps of:
  - for each respective pixel, obtaining from a texture map a corresponding texel, the corresponding texel comprising a control code and a color value and having a two-dimensional texel coordinate,
  - for each corresponding texel, responsive to an enable signal and the control code for the corresponding texel when the control code is of a first value and the enable signal is a first value, selectively performing a lighting operation to modify the color value of the corresponding texel based on a lighting condition, and bypassing said lighting operation for the corresponding texel when the control code is of a second value or the enable signal is a second value, and
  - displaying each of the respective pixels on the display screen with the color value of the corresponding texel.

8. The method of claim 7,
wherein the lighting condition is a value dependent on an amount of light within a three-dimensional graphic scene to be displayed on the display screen,
wherein the graphics primitive is part of the three-dimensional graphic scene, and
wherein said step of selectively performing a lighting operation comprises the step of multiplying the lighting condition with the color value of the corresponding texel.

9. The method of claim 7,
wherein the color value of the corresponding texel comprises:
- a red color component;
- a green color component; and
- a blue color component.

10. The method of claim 7,
wherein the control code of the corresponding texel is contained within an alpha component of the corresponding texel.

11. The method of claim 7, further comprising the step of:
generating the enable signal based on said control code of the corresponding texel and further based upon an enable bit and a polarity bit of a control register, wherein said step of generating the enable signal comprises the steps of:
- de-asserting the enable signal provided the enable bit is not set,
- provided the polarity bit is not set, asserting the enable signal provided further that said control code is of a first value and the enable bit is set, and
- provided that the polarity bit is not set, asserting the enable signal provided further that the control code is of a second value and the enable bit is set.

12. The method of claim 11,
wherein the control code of the corresponding texel is programmable between the first value and the second value where the first value is a logical "1".

13. The method of claim 11,
wherein the control code of the corresponding texel is programmable between the first value and a second value wherein the second value is a logical "0".

14. A computer controlled graphics display system comprising:
- means for accessing a memory to obtain a graphics primitive;
- means for translating the graphics primitive into a plurality of pixels, each of the plurality of pixels having a two-dimensional display coordinate; and
- means for displaying each pixel of the graphics primitive on a display screen, said means for displaying comprising:
  - means for obtaining from a texture map, for each pixel, a corresponding texel for a respective pixel, the corresponding texel comprising a control code and a color value and having a two-dimensional texel coordinate;
  - means for selectively performing a lighting operation, in response to the control code, to modify the color value of the corresponding texel based on a lighting condition when said control code is of a first value and bypassing said lighting operation for the corresponding texel when the control code is of a second value; and
  - means for displaying each of the respective pixels on said display screen with the color value of the corresponding texel.

15. The system of claim 14,
wherein the lighting condition is a value dependent on an amount of light within a three-dimensional graphic scene to be displayed on the display screen,
wherein the graphics primitive is part of the three-dimensional graphic scene, and
wherein said means for selectively performing a lighting operation comprises means for multiplying the lighting condition with the color value of the corresponding texel.

16. The system of claim 14,
wherein the color value of the corresponding texel comprises:
- a red color component;
- a green color component; and
- a blue color component.

17. The system of claim 14,
wherein the control code of the corresponding texel is contained within an alpha component of the corresponding texel.

18. The system of claim 14,
wherein the control code of the corresponding texel is programmable between the first value and the second value where the first value is a logical "1".

19. The system of claim 14,
wherein the control code of the corresponding texel is programmable between the first value and a second value wherein the second value is a logical "0".

20. In a computer controlled graphics display system, a system of displaying a graphics image, said system comprising:
- means for accessing a memory to obtain a graphics primitive;
- means for translating the graphics primitive into a plurality of pixels, each of the plurality of pixels having a two-dimensional display coordinate; and means for displaying the graphics primitive on a display screen, said means for displaying comprising:
  means for obtaining, from a texture map, for each respective pixel, a corresponding texel, the corresponding texel comprising a control code and a color value and having a two-dimensional texel coordinate;
  means for selectively performing a lighting operation, for each corresponding texel, responsive to an enable signal and the control code for the corresponding texel when the control code is of a first value and the enable signal is a first value, selectively performing the lighting operation to modify the color value of the corresponding texel based on a lighting condition, and bypassing said lighting operation for the corresponding texel when the control code is of a second value or the enable signal is a second value; and
  means for displaying each of the respective pixels on said display screen with the color value of the corresponding texel.

21. The system of claim 20,
wherein the lighting condition is a value dependent on an amount of light within a three-dimensional graphic scene to be displayed on the display screen,
wherein the graphics primitive is part of the three-dimensional graphic scene, and
wherein said means for performing a lighting operation comprises means for multiplying the lighting condition with the color value of the corresponding texel.

22. The system of claim 20,
wherein the color value of the corresponding texel comprises:
  a red color component;
  a green color component; and
  a blue color component.

23. The system of claim 20,
wherein the control code of the corresponding texel is contained within an alpha component of the corresponding texel.

24. The system of claim 20, further comprising:
means for generating the enable signal based on said control code of the corresponding texel and further based upon an enable bit and a polarity bit of a control register, wherein said means for generating the enable signal comprises:
  means for de-asserting the enable signal provided the enable bit is not set;
  means for asserting the enable signal provided the polarity bit is not set, provided further that said control code is of a first value and the enable bit is set; and
  means for asserting the enable signal provided that the polarity bit is not set, provided further that the control code is of a second value and the enable bit is set.

25. The system of claim 24,
wherein the control code of the corresponding texel is programmable between the first value and the second value where the first value is a logical "1".

26. The system of claim 24,
wherein the control code of the corresponding texel is programmable between the first value and a second value wherein the second value is a logical "0".

* * * * *